United States Patent [19]

Kim

[11] Patent Number: 5,793,922
[45] Date of Patent: Aug. 11, 1998

[54] CHANNEL CODE INPUT AND REPRODUCTION METHOD OF FRAME SWITCHER AND CHANNEL CODE REPRODUCTION APPARATUS

[75] Inventor: Kyoung-ho Kim, Kunpo, Rep. of Korea

[73] Assignee: Samsung Electronics Co., Ltd., Kyungki-do, Rep. of Korea

[21] Appl. No.: 544,176

[22] Filed: Oct. 17, 1995

[30] Foreign Application Priority Data

Oct. 17, 1994 [KR] Rep. of Korea ............... 1994-26542

[51] Int. Cl.$^6$ ............... H04N 5/91; H04N 7/00
[52] U.S. Cl. ............... 386/46; 386/122
[58] Field of Search ............... 386/46, 36, 122, 386/83, 52, 92; 348/385, 731, 734; H04N 5/91, 7/00

[56] References Cited

U.S. PATENT DOCUMENTS 3,988,528  10/1976  Yanagimachi et al. ............... 178/5.6
5,579,122  11/1996  Lee ............... 386/46

*Primary Examiner*—Robert Chevalier
*Attorney, Agent, or Firm*—Sughrue, Mion, Zinn, Macpeak & Seas, PLLC

[57] ABSTRACT

A channel code input and reproduction method and a channel code reproduction apparatus for inputting a channel code having a length of time which is proportional to a magnitude of a channel number. The channel code is reproduced by counting a rectangular wave signal which is generated to detect the length of the channel code. This provides a channel code input and reproduction apparatus of a frame switcher for accurately reproducing a channel code irrespective of a skew.

7 Claims, 3 Drawing Sheets

FIG. 1
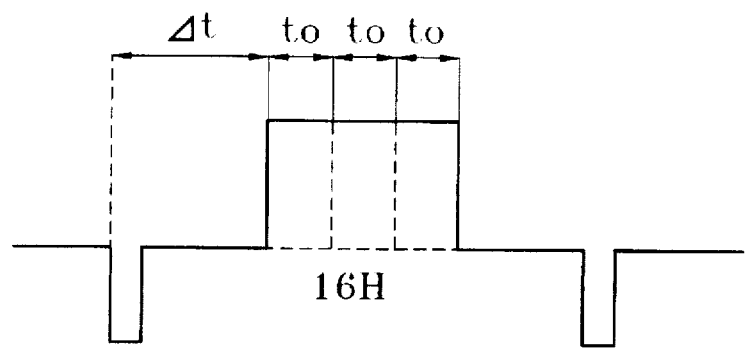
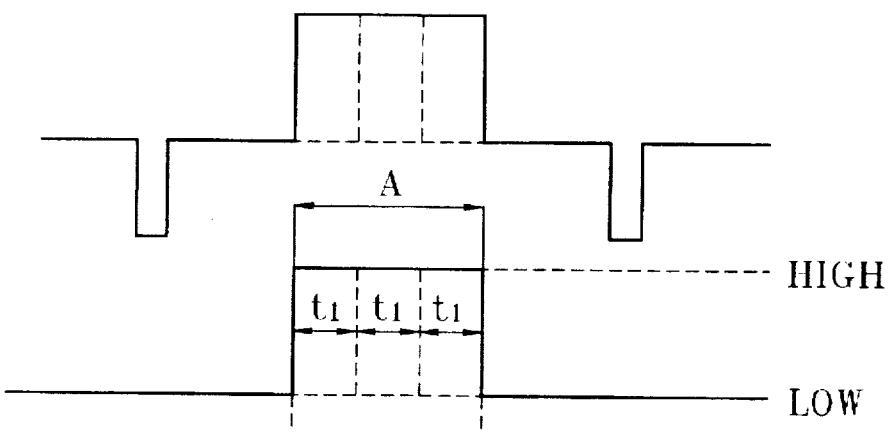
FIG. 2A
FIG. 2B
FIG. 2C
FIG. 2D
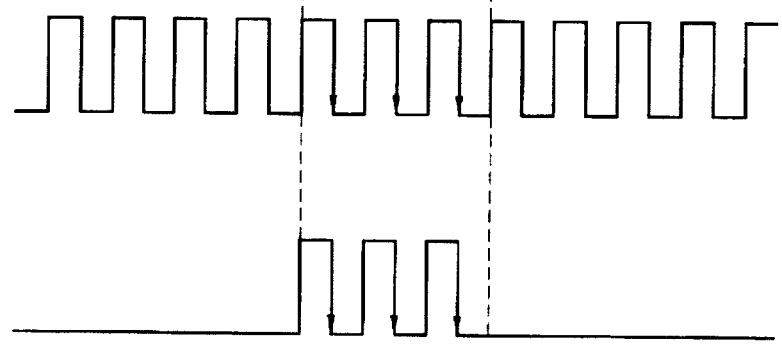

5,793,922

CHANNEL CODE INPUT AND REPRODUCTION METHOD OF FRAME SWITCHER AND CHANNEL CODE REPRODUCTION APPARATUS

BACKGROUND OF THE INVENTION

The present invention relates to a channel code input and reproduction method of a frame switcher and a channel code reproduction apparatus.

A frame switcher is an apparatus for multiple-recording images picked up by a plurality of cameras on a single video cassette recorder (VCR) one frame by one frame in turn. During a multiple recording, a channel code is input by a frame switcher to discriminate each image. To display a user desired channel image on a monitor according to the channel, the channel code input by the frame switcher should be reproduced.

FIG. 1 is a waveform diagram of a video signal into which a channel code input by a conventional method is inserted.

Considering that a channel code is inserted between horizontal sync signals of a video signal and the number of the cameras which can be switched by the frame switcher is eight, the channel code is input as three bits. FIG. 1 shows that since three bits of the channel code are "111," a "channel 8" is input thereto. A time $\Delta t$ between a point of time when data moves up from a lower potential to a higher potential of a channel horizontal sync signal and another point of time when a channel code of the first bit is read, and an interval of time $t_0$ of each bit are determined in advance at the step of inputting the channel code.

The channel code input by the above-described prior art method is reproduced as follows.

After time of $\Delta t$ elapses from a point of time when a potential of the horizontal sync signal moves up from the low potential to the high potential, the first bit "1" of the channel code is read. After time $t_0$ elapses, the second bit "1" is read. After time $t_0$ elapses again, the third bit "1" is read. Accordingly, a 3-bit channel code is read as "111" to reproduce "channel eight."

However, in the above conventional method, a skew phenomenon is generated, and the value of a t is varied. That is, when a t is varied by more than $t_0$ due to the skew, each bit of the channel code is wrongly read out, resulting in mis-reproduction of the channel code.

SUMMARY OF THE INVENTION

Therefore, to solve the above conventional problem that a channel code is mis-reproduced by a skew, it is an object of the present invention to provide a channel code input and reproduction apparatus in which the channel code input adopts a method for inputting the channel code having a length of time proportional to a magnitude of a channel number, and a rectangular wave signal is generated, while a length of the input channel code is detected by a counter during the channel code reproduction, to reproduce the channel code.

To accomplish the above object of the present invention, there is provided a channel code input and reproduction method of a frame switcher comprising the steps of:

inputting a channel code having a length of time proportional to a magnitude of a channel number to a video signal;

separating the channel code from the video signal; and detecting a length of the separated channel code to reproduce the channel code.

The channel code length detecting step to reproduce the channel code comprises the steps of generating a rectangular wave signal, obtaining a signal by logically multiplying the separated channel code and the rectangular wave signal, and counting the logically multiplied result.

There is also provided a channel code reproduction apparatus of a frame switcher, comprising:

channel code separation means for separating a channel code from an input video signal;

rectangular wave signal generation means for generating a rectangular wave signal;

logical multiplication means for outputting a logical multiplication signal of the detected channel code by the rectangular wave signal; and counting means for counting the signal output from the logical multiplication means.

BRIEF DESCRIPTION OF THE DRAWINGS

The preferred embodiments are described with reference to the drawings wherein:

FIG. 1 is a waveform diagram of a video signal into which an input channel code is inserted according to the prior art.

FIGS. 2A through 2D are waveform diagrams for explaining an input and reproduction method according to a first embodiment of the present invention.

DETAILED DESCRIPTION OF THE PREFERRED EMBODIMENT

A preferred embodiment of the present invention will be described below in more detail with reference to the accompanying drawings.

FIGS. 2A through 2D are waveform diagrams for explaining an input and reproduction method according to a first embodiment of the present invention.

FIG. 2A shows a video signal which contains a channel code between horizontal sync signals within a vertical retrace line interval. FIG. 2B shows the channel code which is separated from the video signal of FIG. 2A. The channel code which is input by the channel code input and reproduction method according to the present invention has a length of time proportional to a magnitude of a channel number. The channel code shown in FIG. 2B shows that the channel number is "3." The channel code having a length of time of $3t_1$ is input. FIG. 2C shows a rectangular wave signal for detecting a length of the channel code, in which the rectangular wave signal is a synchronous rectangular wave signal having a unit of time ($t_1$) of the channel code as a period of time and which is synchronized with the channel code. FIG. 2D shows a signal output by a logical multiplication operation of the detected channel code signal of FIG. 2B by the synchronous rectangular wave signal. If the FIG. 2D signal is counted, a length of time of the channel code can be detected. Thus, the channel code is reproduced. Since the counted value becomes "3" in FIG. 2D, the reproduced channel code becomes "3." In the first embodiment of the present invention, since a synchronous rectangular wave signal of which the period is time unit $t_1$ is used, a value counted by a counter is identical to the channel code number.

Figure 3:
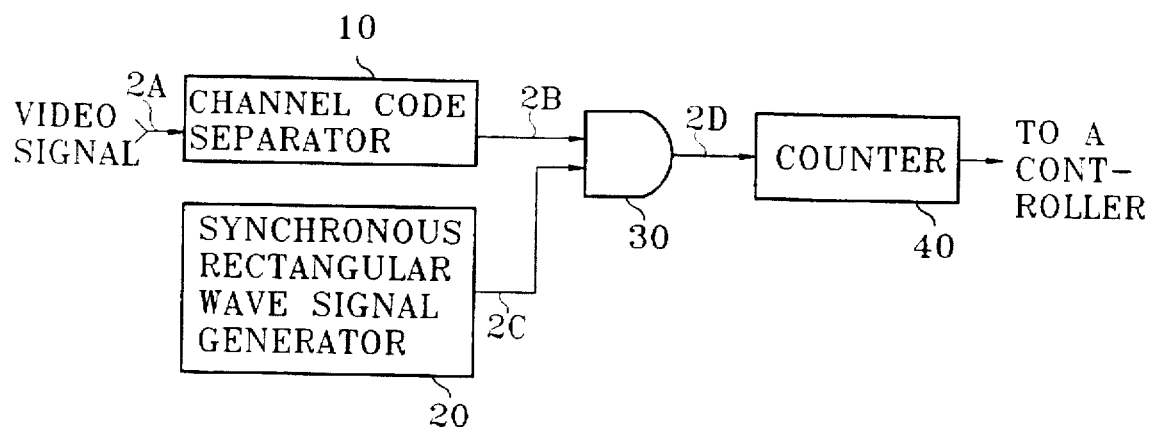
FIG. 3 is a block diagram of a channel code reproduction apparatus which adopts the channel code input and reproduction method according to the first embodiment of the present invention.

FIG. 3 is a block diagram of a channel code reproduction apparatus which adopts the channel code input and reproduction method according to the first embodiment of the present invention.

A video signal 2A including an input channel code is input to a channel code separator 10. Channel code separator 10 separates channel code signal 2B from the input video signal, and outputs the separated channel code signal 2B. Meanwhile, a synchronous rectangular generator 20 generates synchronous rectangular wave signal 2C which is synchronized with the channel code and having a period corresponding to a basic time unit of the channel code. A logical multiplier 30 logically multiplies channel code signal 2B output from channel code separator 10 by a synchronous rectangular wave signal output from synchronous rectangular wave signal generator 20, and outputs the logically multiplied result. A counter 40 counts a signal output from logical multiplier 30 to reproduce the channel code, and supplies the reproduced channel code to a controller (not shown).

Figure 4:
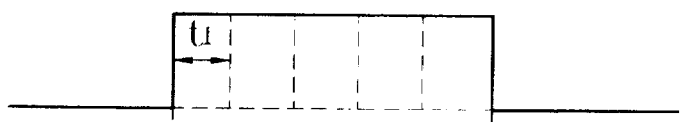
FIGS. 4A through 4C are waveform diagrams for explaining an input and reproduction method according to a second embodiment of the present invention.
Figure 4:
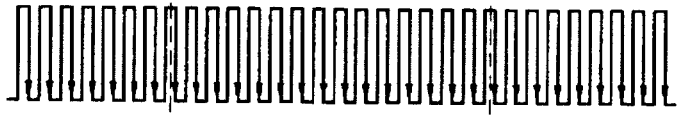
Figure 4:

FIGS. 4A through 4C are waveform diagrams for explaining an input and reproduction method according to a second embodiment of the present invention.

FIG. 4A shows the channel code which is separated from the video signal. The channel code according to the present invention has a length of time proportional to a magnitude of a channel number. The channel code shown in FIG. 4A shows a channel code corresponding to the channel number "3" having a length of time of $5t_1$ is input. FIG. 4B shows a rectangular wave signal for detecting a length of the channel code. The second embodiment of the present invention uses an asynchronous rectangular wave signal having as a period of time $(t_1/n)$ when a unit of time of the channel code is $t_1$ and which is not synchronized with the channel code. FIG. 4B shows the asynchronous rectangular wave signal having a period of $t_1/3$. Here, "n" is an integer.

FIG. 4C shows a signal output by a logical multiplication operation of the detected channel code signal of FIG. 4A by the asynchronous rectangular wave signal of FIG. 4B.

If the FIG. 4C signal is counted, a length of time of the channel code can be detected. Thus, the channel code is obtained by dividing the counted value by "3" according to a period $t_1/3$ of the asynchronous rectangular wave signal. Since the counted value of FIG. 4C is "16" and the quotient obtained by dividing the counted value by "3" is "5," the channel code is "5." In the second embodiment of the present invention, since an asynchronous rectangular wave signal of which the period of time unit $t_1/n$ is used, a quotient which is obtained by dividing the counted value counted by a counter by "n" becomes identical to the channel code number.

Figure 5:
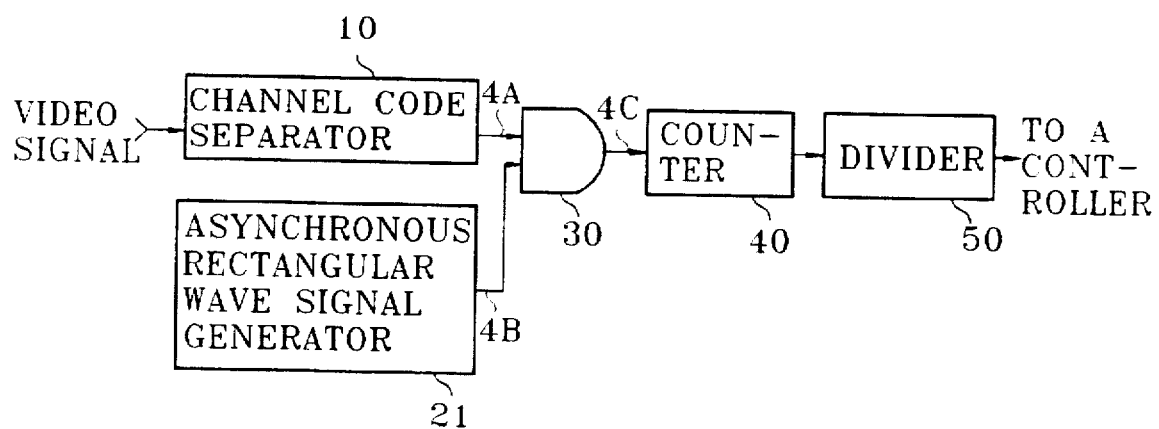
FIG. 5 is a block diagram of a channel code reproduction apparatus which adopts the channel code input and reproduction method according to the second embodiment of the present invention.

FIG. 5 is a block diagram of a channel code reproduction apparatus which adopts the channel code input and reproduction method according to the second embodiment of the present invention.

A video signal including an input channel code is input to a channel code separator 10. Channel code separator 10 separates channel code signal 4A from the input video signal, and outputs the separated channel code signal 4A. Meanwhile, an asynchronous rectangular generator 21 generates asynchronous rectangular wave signal 4B having a period $t_1/n$ obtained by dividing a time unit $t_1$ of the channel code by "n." A logical multiplier 30 logically multiplies channel code signal 4A output from channel code separator 10 by asynchronous rectangular wave signal 4B output from asynchronous rectangular wave signal generator 21, and outputs the logically multiplied result. A counter 40 counts a signal output from logical multiplier 30. A divider 50 divides the value counted by counter 40 by "n" according to period $t_1/n$ of the asynchronous rectangular wave signal, and outputs the quotient obtained as a channel code. The reproduced channel code is supplied to a controller (not shown).

As described above, the present invention adopts a method of inputting a channel code having a length of time which is proportional to a magnitude of a channel number during an input of the channel code, while during reproduction of the channel code a rectangular wave signal is generated to detect a length of the channel code input by a counter and then reproduce the channel code. Accordingly, the present invention provides the channel code input and reproduction method and the channel code reproduction apparatus of a frame switcher for reproducing an accurate channel code irrespective of a skew.

While only certain embodiments of the invention have been specifically described herein, it will be apparent that numerous modifications may be made thereto without departing from the spirit and scope of the invention.

What is claimed is:

1. A channel code input and reproduction method of a frame switcher comprising the steps of:

inputting a channel code having a length of time proportional to a magnitude of a channel number to a video signal;

separating the channel code from the video signal; and detecting a length of the separated channel code to reproduce the channel code wherein the detected length represents the channel code.

2. A channel code input and reproduction method of a frame switcher comprising the steps of:

inputting a channel code having a length of time proportional to a magnitude of a channel number to a video signal;

separating the channel code from the video signal; and detecting a length of the separated channel code to reproduce the channel code, wherein the channel code length detecting step to reproduce the channel code comprises the steps of generating a rectangular wave signal, obtaining a signal by logically multiplying the separated channel code and the rectangular wave signal, and counting the logically multiplied result.

3. The channel code input and reproduction method of a frame switcher according to claim 2, wherein said rectangular wave signal generation step generates a synchronous rectangular wave signal which is synchronized with the channel code and which has a period identical to a basic time unit of the channel code.

4. The channel code input and reproduction method of a frame switcher according to claim 2, wherein said rectangular wave signal generation step further comprises the steps of generating an asynchronous rectangular wave signal which is not synchronized with the channel code and having a period obtained by dividing a basic time unit of the channel code by "n" and obtaining a quotient which is obtained by dividing the value counted in said counting step by "n" in which "n" is an integer.

5. A channel code reproduction apparatus of a frame switcher, comprising:

channel code separation means for separating a channel code from an input video signal;

rectangular wave signal generation means for generating a rectangular wave signal;

logical multiplication means for outputting a logical multiplication signal of the separated channel code by the rectangular wave signal; and counting means for counting the signal output from the logical multiplication means.

6. The channel code reproduction apparatus of a frame switcher according to claim 5, wherein said rectangular wave signal generation means is a synchronous rectangular wave signal generator for generating a synchronous rectangular wave signal which is synchronized with the channel code and which has a period identical to a basic time unit of the channel code.

7. The channel code reproduction apparatus of a frame switcher according to claim 5, wherein said rectangular wave signal generation means comprises an asynchronous rectangular wave signal generator for generating an asynchronous rectangular wave signal which is not synchronized with the channel code and which has a period obtained by dividing a basic time unit of the channel code by "n" and a divider for obtaining a quotient which is obtained by dividing the value counted by said counting means by "n" in which "n" is an integer.

* * * * *